US012560724B2

(12) United States Patent  
Kleijer

(10) Patent No.: US 12,560,724 B2  
(45) Date of Patent: Feb. 24, 2026

(54) METHOD AND SYSTEM FOR FAST IONOSPHERE SCINTILLATION DETECTION

(71) Applicant: Septentrio N.V., Leuven (BE)

(72) Inventor: Frank Kleijer, Leuven (BE)

(73) Assignee: Septentrio N.V., Leuven (BE)

( * ) Notice: Subject to any disclaimer, the term of this patent is extended or adjusted under 35 U.S.C. 154(b) by 307 days.

(21) Appl. No.: 18/255,315

(22) PCT Filed: Dec. 3, 2021

(86) PCT No.: PCT/EP2021/084138

§ 371 (c)(1),  
(2) Date: May 31, 2023

(87) PCT Pub. No.: WO2022/117802

PCT Pub. Date: Jun. 9, 2022

(65) Prior Publication Data

US 2024/0004084 A1 Jan. 4, 2024

(30) Foreign Application Priority Data

Dec. 3, 2020 (EP) ..................................... 20211724

(51) Int. Cl.  
*G01S 19/07* (2010.01)  
*G01S 19/29* (2010.01)  
(Continued)

(52) U.S. Cl.  
CPC ............ *G01S 19/072* (2019.08); *G01S 19/29* (2013.01); *G01S 19/04* (2013.01); *G01S 19/14* (2013.01); *G01S 19/21* (2013.01); *G01S 19/32* (2013.01)

(58) Field of Classification Search  
CPC .......... G01S 19/14; G01S 19/32; G01S 19/21; G01S 19/072; G01S 19/29; G01S 19/04  
(Continued)

(56) References Cited

U.S. PATENT DOCUMENTS

| | | | | |
|---|---|---|---|---|
| 7,375,680 B2 * | 5/2008 | Watson | ................... | G01S 19/32 |
| | | | | 342/357.23 |
| 8,130,143 B2 * | 3/2012 | Liu | ......................... | G01S 19/32 |
| | | | | 342/357.44 |

(Continued)

FOREIGN PATENT DOCUMENTS

| | | | | | |
|---|---|---|---|---|---|
| KR | 20230074629 A | * | 5/2023 | ............. | G01S 19/43 |
| WO | 2009125011 A1 | | 10/2009 | | |
| WO | WO-2010096158 A2 | * | 8/2010 | ............. | G01S 19/07 |

OTHER PUBLICATIONS

International Search Report and Written Opinion of the International Searching Authority from the European Patent Office, in PCT/EP2021/084138 dated May 3, 2022, which is an international application corresponding to this U.S. application.

(Continued)

*Primary Examiner* — Chuong P Nguyen  
(74) *Attorney, Agent, or Firm* — Kolitch Romano Dascenzo Gates LLP

(57) ABSTRACT

A method is disclosed for detecting a disturbance in a signal of a GNSS satellite. The method includes receiving from the GNSS satellite a first signal and a second signal having a carrier frequency different from a carrier frequency of the first signal; measuring a carrier phase difference between the first signal and the second signal and between different epochs; determining an ionosphere delay rate; determining a first indicator; and detecting the disturbance based on the first indicator meeting a predetermined requirement. The first indicator is determined by a first Kalman filter. A quadratic expression given by $\frac{1}{2}(\Delta\phi_{12}+\mu\dot{I}_r\Delta t)^2$, wherein $\Delta\phi_{12}$ represents the measured carrier phase difference and $\dot{I}_r$ represents the ionosphere delay rate, is used in the first Kalman filter as an observable.

15 Claims, 11 Drawing Sheets

(51) Int. Cl.

| | |
|---|---|
| *G01S 19/04* | (2010.01) |
| *G01S 19/14* | (2010.01) |
| *G01S 19/21* | (2010.01) |
| *G01S 19/32* | (2010.01) |

(58) Field of Classification Search

USPC ............ 342/357.44, 357.52, 357.59, 357.72, 342/357.68, 357.41

See application file for complete search history.

(56) References Cited

U.S. PATENT DOCUMENTS

| | | | | |
|---|---|---|---|---|
| 9,244,174 | B2 * | 1/2016 | Averin ................. | G01S 19/073 |
| 9,488,729 | B2 * | 11/2016 | Averin .................... | G01S 19/32 |
| 9,923,626 | B2 * | 3/2018 | Loomis ................... | G01S 19/43 |
| 10,551,505 | B2 * | 2/2020 | Memarzadeh .......... | G01S 19/08 |
| 11,585,948 | B2 * | 2/2023 | Muthuraman .......... | G01S 19/40 |
| 12,032,077 | B2 * | 7/2024 | Zhang ..................... | H04W 4/40 |
| 12,339,373 | B2 * | 6/2025 | Doucet ................ | G01S 19/072 |
| 12,399,281 | B2 * | 8/2025 | Zhodzishsky ......... | G01S 19/072 |

| | | | | |
|---|---|---|---|---|
| 2009/0224969 | A1 * | 9/2009 | Kolb ...................... | G01S 19/44 |
| | | | | 342/357.27 |
| 2015/0226855 | A1 | 8/2015 | Averin et al. | |
| 2015/0253431 | A1 | 9/2015 | Averin et al. | |
| 2024/0393468 | A1 * | 11/2024 | Doucet ................... | G01S 19/04 |
| 2024/0393469 | A1 * | 11/2024 | Doucet ................... | G01S 5/011 |
| 2025/0370144 | A1 * | 12/2025 | Wang ................... | G01S 19/072 |

OTHER PUBLICATIONS

Ghoddousi-Fard, Reza, et al.; "GPS phase difference variation statistics: A comparison between phase scintillation index and proxy indices", obtained from ScienceDirect, Advances in Space Research, vol. 52, No. 8, p. 1397-1405, Jul. 23, 2013.

Pi, X., et al.; "Monitoring of global ionospheric irregularities using the worldwide GPS network", Geophysical Research Letters, vol. 24, No. 18, p. 2283-2286, Sep. 15, 1997.

Susi, Melania, et al.; "Design of a robust receiver architecture for scintillation monitoring", 2014 IEEE/Ion Position, Location And Navigation Symposium Plans, p. 73-81, May 14, 2014.

* cited by examiner

METHOD AND SYSTEM FOR FAST IONOSPHERE SCINTILLATION DETECTION

TECHNICAL FIELD

The present disclosure is related to methods and systems for detecting disturbances in signals received from Global Navigation Satellite System (GNSS) satellites. In particular, the present disclosure is related to methods and systems for detecting ionospheric scintillations and other line-of-sight disturbances in such signals.

BACKGROUND

Global Navigation Satellite System (GNSS) is a general name for a satellite navigation system. A GNSS system comprises, among other things, a constellation of multiple navigation satellites, which are orbiting the earth and which transmit dedicated navigation signals also called 'ranging signals'. Most known is the Global Positioning System (GPS) developed by the United States Government. Other systems include the Galileo system which is currently in development by the European Space Agency (ESA), the Russian GLONASS and the Chinese BeiDou system. The primary purpose of these systems is to provide position, velocity and time to any user on or near the Earth's surface. The user determines his position in space and time by measuring his pseudorange to at least 4 satellites whose position and time are accurately determined, the range being defined as the distance between the user and a satellite.

Proper operation of high-rate GNSS receivers depends on high-quality phase and code observations. Especially the quality of the phase observations is important for the high-accuracy positioning modes RTK (Real-Time Kinematic) and PPP (Precise Point Positioning). Early detection of reduced quality measurements due to external circumstances is important to warn the user of the GNSS receiver that normal operation is blocked or limited. Two such circumstances are ionospheric scintillation and operation under foliage. In both cases the signal propagations along the lines-of-sight to the satellites are compromised. Because this may hold for a subset of all lines-of-sights, limited operation may still be possible if the compromised signals are discarded in the RTK or PPP positioning algorithms and only the signals of the remaining satellites are being used.

Each GNSS satellite sends signals at different carrier frequencies. These carrier frequencies differ per constellation and in fact even per satellite block within a constellation. GPS for example uses two frequencies (L1=1575.42 MHz and L2=1227.60 MHz) in the older blocks II and three frequencies in the newer blocks II-F and III (L1, L2, and L5=1176.45 MHz). On these frequencies different signals may be encoded, e.g. L1CA, and L1P(Y) on L1, and L2P(Y) on L2 on older satellites and L1C and L2C on newer satellites. These signals can be tracked by a GNSS receiver resulting in code measurements, but also the carrier phases of the signals can be tracked resulting in phase measurements which are much more accurate than the code measurements. Despite an additional phase cycle bias, the phase measurements are therefore much more suitable for the precise positioning techniques. Because on older GPS satellites there is no L2C signal and the L2P(Y) code is encrypted, the L2 frequency is only accessible through a semi-codeless tracking technique. With this technique the resulting L2P phase measurement is correlated with the L1 phase measurement.

Measurement of scintillation is possible with dedicated GNSS receivers (ionospheric scintillation monitoring receivers, or ISMRs) that output standardized scintillation indices based on the sampling of the signal amplitude and phase at a high rate (typically 50 Hz or more). Besides the need for operating at high rate, these receivers require a very stable clock reference to distinguish phase variations due to the ionosphere from phase variations due to the clock jitter. This comes with a significant cost, size and power consumption penalty. Standard GNSS receivers typically operate at lower rates, such as about 1 Hz, and use cheaper and smaller clocks.

US 2015/0253431 describes a method for detecting ionospheric scintillation by calculating a geometry free combination (GFC) parameter based on code phase pseudo-range measurements of two signals received from a same GNSS satellite having different frequencies. The GFC parameter is calculated by:

$$GFC=(\phi_1-\phi_2)/(\mu^*-1),$$

wherein $\phi_1$ and $\phi_2$ are the phase measurements of the two signals, and $\mu^*=f_1^2/f_2^2$ wherein $f_1$ and $f_2$ represent the carrier frequencies of the two signals. The GFC parameter provides an estimation of the ionosphere signal delay for the signals. A dispersion of the GFC parameter, which can be represented by the variance of the GFC, is used for detecting the presence of scintillation. If a value of the dispersion exceeds a predetermined threshold value, ionosphere scintillation is detected.

One drawback of the above method is that it is slow, as it needs to gather a batch of data over a certain period of time before being able to determine the variance. This is because detrending needs to be applied to eliminate unknowns in the equations and compute a variance. This may pose problems in high-accuracy positioning modes of GNSS receivers, where early detection of compromised signals is critical for reliable operation. Another drawback is that computing a variance over a sample time can result in inaccurate estimates of the variance, in particular when the sample consists of both a low noise part and a high noise part, which would occur exactly when scintillation starts kicking in.

WO 2009/125011 describes a method for vector phase tracking a plurality of global positioning satellite carrier signals. In the method, the ionospheric drift is estimated by a linear minimum mean square error estimator using the square difference of carrier phase measurement and ionospheric drift for multiple epochs. Such an estimator suffers from the same drawbacks as indicated above, i.e. it is slow in that it needs to gather a batch of data over multiple epochs in order to provide an estimate.

SUMMARY

There is therefore a need in the art for methods allowing to estimate satellite signal disturbances more reliably, more accurately and/or faster than prior art methods and without requiring the expensive infrastructure of current ISMRs. There is also a need in the art for GNSS receivers, in particular non-ISMR GNSS receivers implementing such improved methods.

According to a first aspect of the present disclosure, there is therefore provided a method of detecting a disturbance in a (carrier) signal of a GNSS satellite as set out in the appended claims.

A method as described herein comprises receiving from the GNSS satellite a first signal and a second signal, the second signal having a carrier frequency different from a carrier frequency of the first signal and measuring a carrier phase difference between the first signal and the second signal. According to an aspect of the present disclosure, the method comprises determining an ionosphere delay rate. The ionosphere delay rate can be determined for a reference frequency, which can be the carrier frequency of the first signal or the second signal, or any other suitable frequency of a signal emitted by the GNSS satellite. The method further comprises determining a first indicator based on a quadratic expression comprising or consisting of a squared sum of a first term and a second term. The first term comprises or consists of the measured carrier phase difference and the second term comprises the determined ionosphere delay rate.

According to the present disclosure, a quadratic expression (i.e. an expression comprising a squared term) is used as basis to construct an indicator for detecting the disturbance. The indicator is advantageously a variance tracer, in particular a tracer for the thermal noise variance. The quadratic expression is advantageously an observable for the indicator. By using a quadratic expression comprising the squared sum of both the measured carrier phase difference between two or more signals and the ionosphere delay rate, a more accurate indicator/tracer is obtained, which advantageously provides a direct and unbiased indication of the thermal noise variance, hence allowing for more accurate detection. The quadratic expression is advantageously defined by $\frac{1}{2}(\Delta\phi_{12}+\mu\dot{I}_r\Delta t)^2$, in which $\Delta\phi_{12}$ represents the measured carrier phase difference and $\dot{I}_r$ represents the determined ionosphere delay rate. Furthermore, the indicator so obtained provides faster convergence and eliminates the need to take batches of data taken over multiple epochs.

Advantageously, the first indicator is determined by a first Kalman filter, i.e. the first indicator is an estimated state $\hat{x}_k$ obtained by the first Kalman filter. Advantageously, the quadratic expression is used in the first Kalman filter as an observable. By using a Kalman filter to determine the indicator or tracer, an even faster initialization is obtained. Furthermore, the Kalman filter only uses input measurements of the current and previous epoch, and therefore eliminates any waiting times due to the use of batches of data over multiple epochs. Yet additionally, using a quadratic expression as observable in the Kalman filter allows to obtain a direct and unbiased estimation of the thermal noise variance, providing more accurate results compared to the indicators of the prior art, such as in US 2015/0253431 which use an estimate of the ionosphere delay rate variance instead, which in turn may be an indicator of the thermal noise variance.

Advantageously, the measured carrier phase difference is used as an input for determining the ionosphere delay rate. Advantageously, the ionosphere delay rate is determined by a second Kalman filter. By using a Kalman filter to determine the ionosphere delay rate, a more accurate result for the ionosphere delay rate can be obtained, which can furthermore be obtained faster. Advantageously, the second Kalman filter uses as input the measured carrier phase difference. Even more advantageously the output of the first Kalman filter is used to determine a variance in the second Kalman filter, for even more accurate results.

According to a second aspect of the present disclosure, there is provided a method of determining navigation data based on GNSS navigation signals as set out in the appended claims. Methods according to the second aspect comprise checking a signal disturbance by performing the method according to the first aspect. For the signal in respect of which a disturbance is detected, the method comprises excluding a measurement of the signal, or applying a reduced weight to the measurement when determining the navigation data, wherein the measurement can refer to a carrier phase measurement and/or a code measurement.

According to a third aspect of the present disclosure, there is provided a GNSS receiver system, or an ionospheric scintillation monitoring device. The GNSS receiver system comprises a computing unit configured or programmed to carry out the method of the first aspect and possibly the method of the second aspect. The ionospheric scintillation monitoring device comprises a computing unit configured or programmed to carry out the method of the first aspect above.

Described herein are methods that detect carrier phase fluctuations on a satellite-by-satellite basis. The methods are light on CPU and can run at low observation intervals, e.g. 1 second. As a result, methods as described herein can advantageously be used in standard GNSS (positioning/navigation) receivers, providing accurate results not only at higher sampling rates of 50 Hz, but even at lower sampling rates, e.g. 1 Hz or 10 Hz. The methods described herein generally do not make a distinction between scintillation and foliage as cause for the phase fluctuations. Methods as described herein are targeted to static or slow-moving rover GNSS receivers, but can also run on measurements of an RTK base receiver. In the latter case, the measurements from the RTK base can be used to steer operation of the rover positioning method.

BRIEF DESCRIPTION OF THE DRAWINGS

Aspects of the present disclosure will now be described in more detail with reference to the appended drawings, wherein same reference numerals illustrate the same features and wherein.

DETAILED DESCRIPTION

Figure 1A:
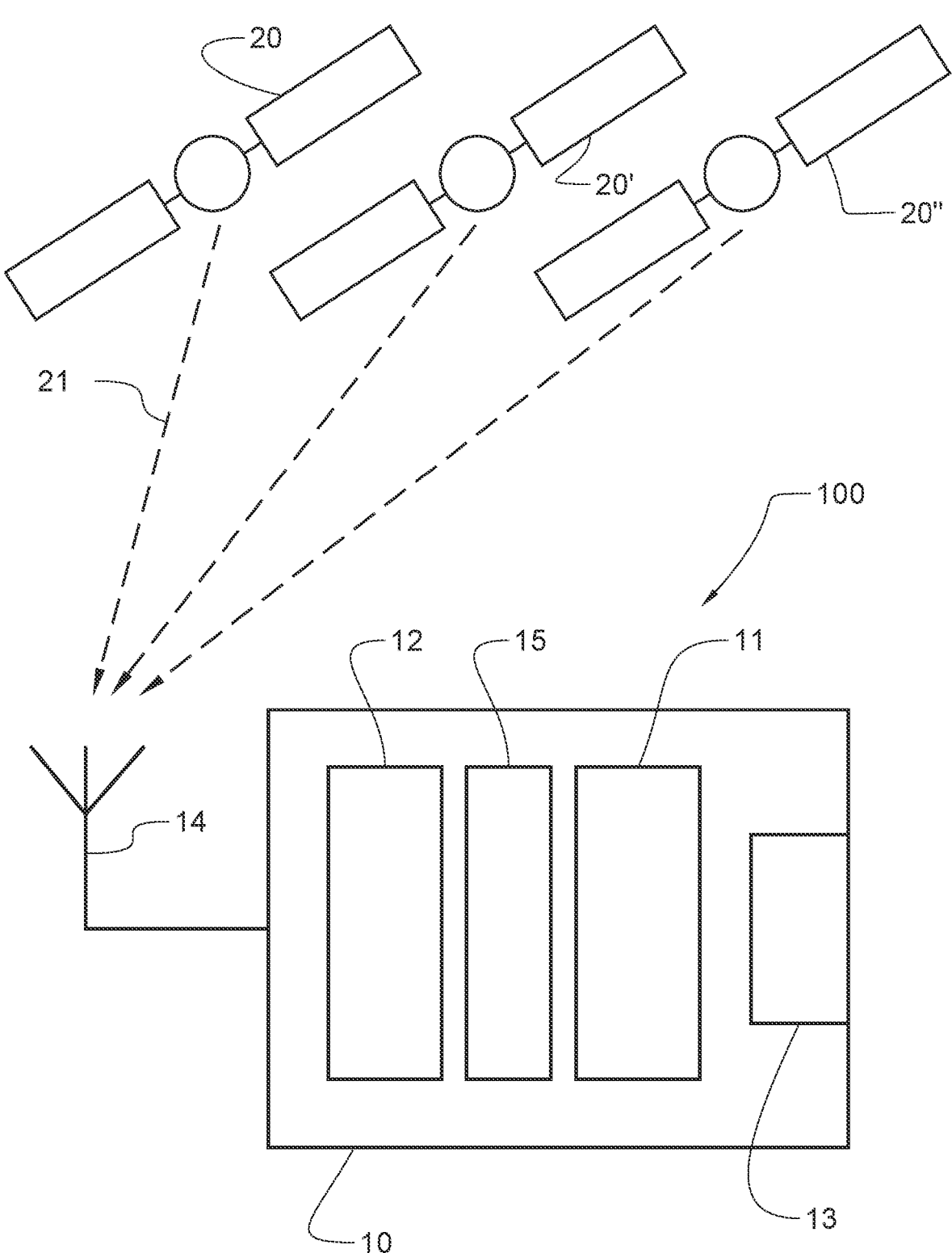
FIG. 1A represents a block diagram of a GNSS receiver system as described herein.

Referring to FIG. 1A, a GNSS receiver system 100 comprises a receiver unit 10, referred to as a 'receiver', and an antenna 14 for receiving GNSS navigation signals 21 from a plurality of navigation satellites 20, 20', 20". The navigation satellites can all belong to a specific GNSS constellation such as though not limited to GPS, Galileo, GLONASS, etc. but alternatively they can belong to more than one specific GNSS constellation. The GNSS receiver unit 10 comprises a positioning module 11 and a tracking module 12 coupled to antenna 14. The tracking module 12 is configured to perform code and phase measurements on the navigation signals 21 received from satellites 20, 20', 20". The positioning module 11 is configured to process the code and phase measurements from tracking module 12 to compute navigational data, such as position, velocity, elevation, etc. The positioning module 11 can be configured to operate according to one or a plurality of operational modes, such as PPP or RTK.

The antenna 14 can be mounted in a fixed relationship to the receiver unit 10. Alternatively, the antenna 14 is movable with respect to the receiver unit 10, and can be coupled to the receiver unit 10 through a wired or wireless connection.

Positioning module 11 is operable to process the code and phase measurements determined by tracking module 12 and determine a navigation output, such as position, velocity, time, etc. Positioning module 11 feeds the navigation output to an output module 13 of the GNSS receiver system, such as a user interface, or any other suitable interface communicating with an external device.

The navigation signals 21 comprise carrier signals modulated by pseudo-random binary codes that are unique to each satellite 20, 20', 20". The tracking module 12 measures the time difference between the signal emission by the satellite and its reception by the antenna 14, resulting in code measurements. This time difference, multiplied by the speed of light, is the pseudorange. The term "pseudorange" is used instead of "range" because the time difference is measured with non-ideal clocks and contains a clock offset term. To measure the time difference, the receiver synchronizes a local replica of the spreading code with the spreading code incoming from the satellite. The time difference is the delay that the receiver had to apply to its local replica to synchronize it with the incoming code.

To increase positioning accuracy, the tracking module 12 is configured to additionally measure the carrier phase of the signals received from satellites 20, 20', 20". This allows to obtain a higher positioning accuracy. The precision of the phase observables is typically about 1 percent of the carrier wavelength, i.e. ~0.01×20 cm=2 mm. The precision of the code measurements is typically about 0.1 percent of the chip length, i.e. ~0.001×300 m=30 cm.

In the context of the present description, we assume that satellites 20, 20', 20" each emit at least two signals having different carrier frequencies $f_1$ and $f_2$, i.e. the navigation signals 21 of each satellite 20, 20', 20" comprise at least two signals with carrier frequencies $f_1$ and $f_2$ respectively. The carrier frequencies $f_1$, $f_2$ refer to carriers in different frequency bands at which the satellite emits navigation signals, e.g. the L1, L2 and L5 frequency bands for GPS satellites.

Figure 1B:
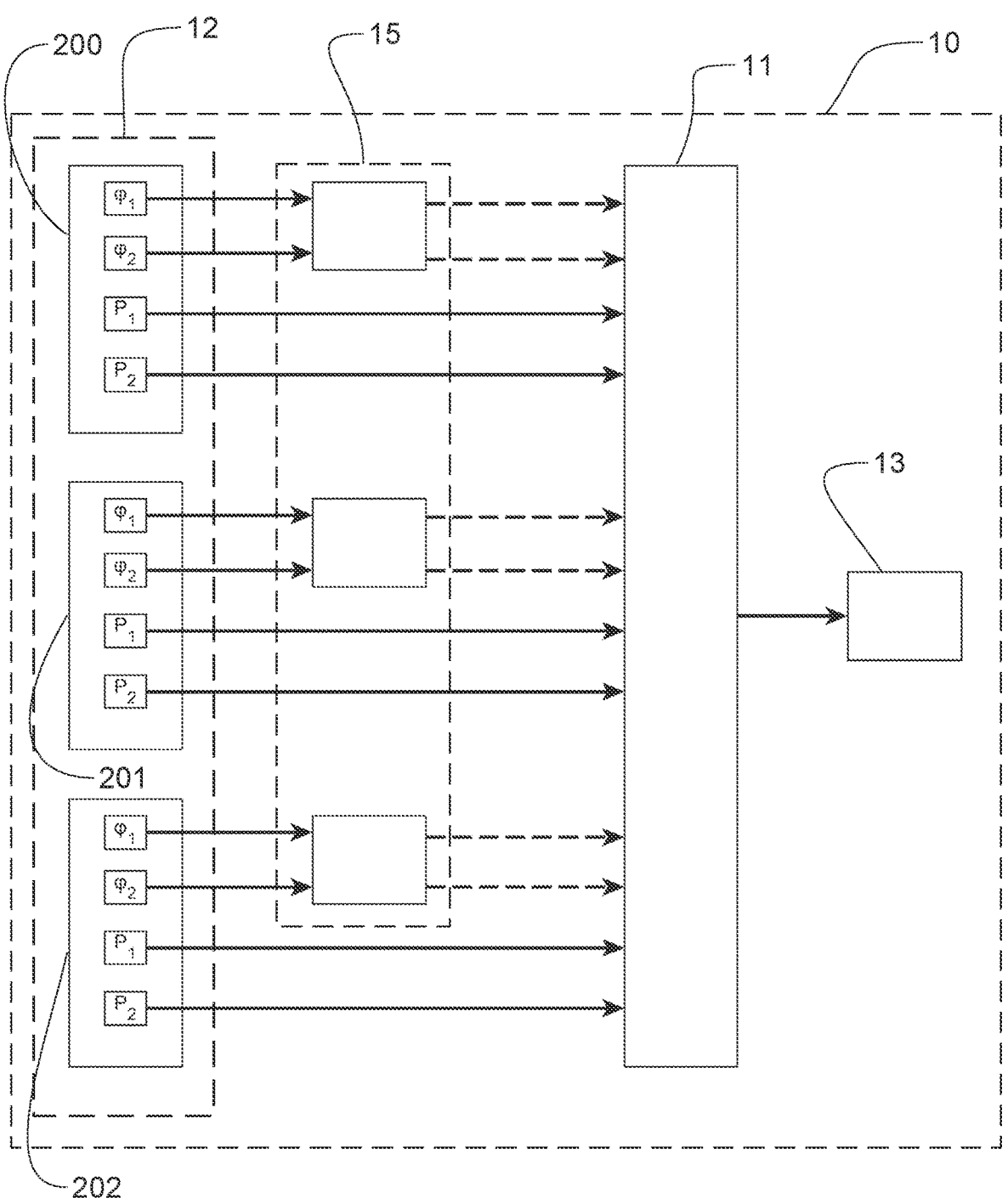
FIG. 1B represents an operational diagram of the GNSS receiver system of FIG. 1A operating according to the present disclosure.

Referring to FIG. 1B, the tracking module 12 is configured to perform a phase measurement on the signals, resulting in measured phases $\phi_1$ and $\phi_2$ for the two different carrier frequencies $f_1$ and $f_2$ respectively. Tracking module 12 determines for each satellite one or more code measurements $P_1$ and $P_2$. Additionally, tracking module 12 determines for each satellite carrier phase measurements $\phi_1$ and $\phi_2$ for signals with carrier frequency $f_1$ and $f_2$ respectively. This is shown diagrammatically in FIG. 1B by the different boxes

200, 201, 202 representing the measurements made by tracking module 12 for satellites 20, 20' and 20" respectively.

According to an aspect of the present disclosure, the carrier phase measurements are utilized to detect a disturbance in the signal of a respective satellite. To this end, receiver unit 10 comprises a disturbance detection module 15, which analyzes the phase measurements $\phi_1$ and $\phi_2$ on a satellite-by-satellite basis to detect whether the signal is disturbed. If a disturbance is detected, disturbance detection module 15 is configured to provide an indication to the positioning module 11 that the navigation signal of a particular satellite is disturbed. Based on the indication, the positioning module 11 is configured to either discard the phase measurements and/or code measurements of the particular satellite for which a disturbance is detected, or to apply a lower weighting value to these measurements when determining the navigation output.

The disturbance detection module 15 is implemented with a disturbance detection method according to aspects of the present disclosure as described below. In the following, the disturbance detection method will be described considering the L1-L2 carrier phase differences as inputs, where L1 and L2 are the GPS L1 and L2 carrier frequencies. It will however be appreciated that methods according to the present disclosure can operate on any two or more carrier frequencies for any GNSS constellation, such as GLONASS, Galileo, BeiDou, QZSS, etc.

Firstly, some theoretical considerations on a tracer for ionospheric scintillation are given. The L1-L2 carrier phase difference $\phi_{12}(k) = \phi_1(k) - \phi_2(k)$ at epoch t(k) depends on the following parameters:

$$\phi_{12}(k) = -I_{12}(k) + A_{12} + mp_{12}(k) + b_{12}(k) + \varphi_{12}(k) + \varepsilon_{12}(k). \tag{1}$$

where $I_{12}(k) = I_1(k) - I_2(k)$ is the ionosphere delay difference, $A_{12}$ the constant ambiguity term, $mp_{12}(k)$ the phase multipath difference, $b_{12}(k)$ the hardware delay difference, $\varphi_{12}(k)$ the phase wind-up difference, and $\varepsilon_{12}(k)$ the thermal noise.

Because $$\frac{I_1(k)}{\lambda_1^2} = \frac{I_2(k)}{\lambda_2^2} = \frac{I_r(k)}{\lambda_r^2}. \tag{2}$$

with $\lambda_1$, $\lambda_2$, $\lambda_r$, referring to the wavelength of respectively the carrier frequency $f_1$, the carrier frequency $f_2$ and a reference frequency r, the ionosphere delay difference can be expressed as $$I_{12}(k) = \underbrace{\left(\frac{\lambda_1^2}{\lambda_r^2} - \frac{\lambda_2^2}{\lambda_r^2}\right)}_{\mu} I_r(k). \tag{3}$$

The reference frequency r can be the frequency of the first carrier, the second carrier or any other frequency. The selection of the reference frequency depends on the GNSS system. Typically, the first frequency is used, i.e. $\mu = 1 - \lambda_2^2/\lambda_1^2$. However, for GLONASS, which uses different frequencies for different satellites, the nominal first frequency, i.e. the first frequency of a satellite with frequency number zero is used as the reference frequency. If the hardware delay rates, phase wind-up rates and multipath rates are neglected, and it is assumed that there are no cycle slips, the L1–L2 carrier phase time difference yields:

$$\Delta\phi_{12}(k) = \phi_{12}(k) - \phi_{12}(k-1) = -\mu I_r(k) + \mu I_r(k-1) + \varepsilon_{12}(k) - \varepsilon_{12}(k-1). \tag{4}$$

Since the ionosphere delay changes slowly, it can be assumed that between two epochs (typically one second) the ionosphere delay rate is constant, yielding:

$$\Delta\phi_{12}(k) = -\mu\dot{I}_r(k)\Delta t(k) + \varepsilon_{12}(k) - \varepsilon_{12}(k-1), \tag{5}$$

where $\Delta t(k) = t(k) - t(k-1)$ is the time difference between the two epochs, and $\dot{I}_r(k)$ is the ionosphere delay rate. Dividing by $\Delta t(k)$ gives:

$$\Delta\dot{\phi}_{12}(k) = \frac{\Delta\phi_{12}(k)}{\Delta t(k)}, \tag{6}$$

which Pi, X., A. J. Mannucci, U. J. Lindqwister, and C. M. Ho (1997), Monitoring of global ionospheric irregularities using the worldwide GPS network, Geophysical Research Letters, Vol. 24, No. 18, pp. 2283-2286 call the Rate Of TEC (total electron content), abbreviated as ROT. They define the standard deviation of the ROT over a certain time, the Rate Of TEC Index (ROTI), as an indicator of scintillation. In both Pi et al. and US 2015/0253431 described above, the variances are driven by the L1-L2 thermal noise $\varepsilon_{12}$.

Conversely, in methods of the present disclosure, a different approach is taken. The variance of the thermal noise is taken as a tracer for scintillation and other line-of-sight disturbances.

From Eq. (5), it has been observed that squaring the term $\Delta\phi_{12}(k) + \mu\dot{I}_r(k)\Delta t(k)$ gives a variance tracer. To this end, an observable is formed by $$y_k = \tfrac{1}{2}(\Delta\phi_{12}(k) + \mu\dot{I}_r(k)\Delta t(k))^2. \tag{7}$$

In Eq. (7) the factor ½ is optional. It is introduced here to obtain a direct observable of the thermal noise variance because measurements of two (consecutive) epochs will be used to determine the input noise, as will be described below. To determine the observable of Eq. (7), two factors need to be determined, viz. the carrier phase difference at epoch k: $\Delta\phi_{12}(k)$ and the ionosphere delay rate at epoch k: $\dot{I}_r(k)$. From Eq. (3) it can be seen that $\mu$ represents the relation between the delay rates at different frequencies, making Eq. (7) independent of the choice for a reference frequency. In aspects of the present disclosure, a disturbance is detected on the basis of the observable of Eq. (7).

In the context of the present disclosure the term carrier phase difference $\Delta\phi_{12}$ refers to a difference of the carrier phase between two signals having different carrier frequencies $f_1$ and $f_2$ and between two (consecutive) epochs, e.g. k and k−1. Such carrier phase difference may be referred to as carrier phase double difference.

In the context of the present disclosure, the ionosphere delay rate can refer to a change in ionosphere delay along the line of sight. The ionosphere delay rate can have both a temporal and spatial component, and can include either one or both the ionosphere-over-time changes and the line-of-sight changes. No Taylor assumption is generally required.

Figure 2:
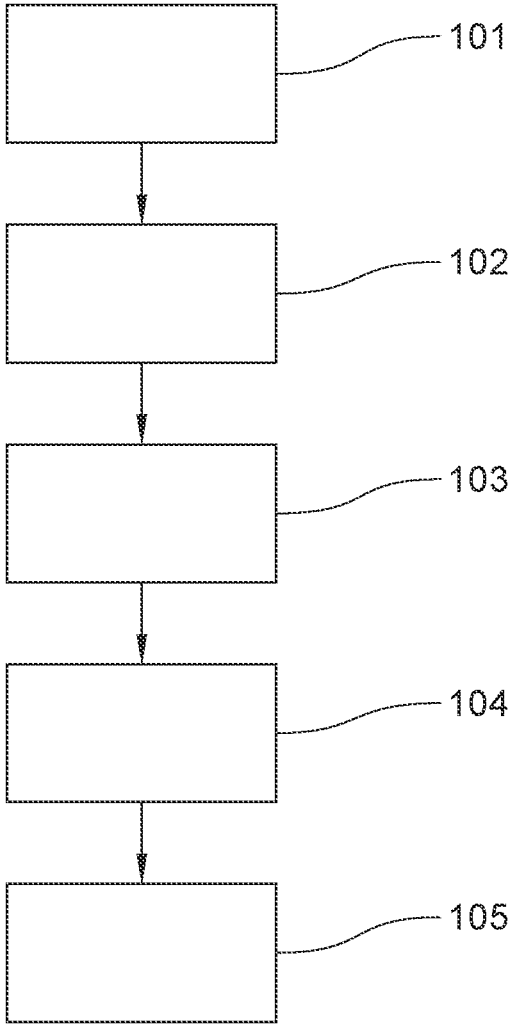
FIG. 2 represents a flow diagram of methods according to the present disclosure.

Referring to FIG. 2, methods according to the present disclosure comprise a first step 101 of receiving from at least one, preferably each one of the GNSS satellites 20, 20', 20" a first signal and a second signal having a carrier frequency different from a carrier frequency of the first signal. The first and the second signals are received by antenna 14 of GNSS receiver system 100. In a second step 102, a carrier phase difference between the first signal and the second signal is measured. Advantageously, step 102 comprises measuring a first carrier phase $\phi_1$ of the first signal and a second carrier phase $\phi_2$ of the second signal and taking the difference $\Delta\phi_{12}$. The carrier phases are measured by tracking module 12.

In a third step 103, an ionosphere delay rate $\dot{I}_r$ for a reference frequency is determined. As will be described further below, advantageously, the ionosphere delay rate is determined on the basis of the measured carrier phase difference. Step 103 can comprise determining a thermal noise variance. In this case, the ionosphere delay rate is determined on the basis of the measured carrier phase difference and the determined thermal noise variance.

In a fourth step 104, a first indicator based on a quadratic expression is determined. The quadratic expression comprises a squared sum of a first term and a second term, wherein the first term comprises the measured carrier phase difference of step 102 and the second term comprises the ionosphere delay rate determined in step 103. Advantageously, the first indicator refers to the variance tracer, determined according to Eq. (7). This variance tracer is representative of the thermal noise variance.

In a fifth step 105, a test is performed on the basis of the indicator determined in step 104. If the test meets a predetermined requirement, e.g. its outcome is true, the method can determine that a disturbance is detected. If the test does not meet the requirement, the method can determine that a disturbance is not detected. The test can comprise comparing the indicator value to a threshold. If the indicator value exceeds the threshold, the test outcome can be true. Advantageously, a plurality of threshold levels are provided, each one corresponding to a different severity level of the disturbance. By comparing the indicator value with the plurality of threshold levels, the disturbance can be categorized into different severity levels.

It will be appreciated that steps 101-105 are repeated at each epoch. Additionally, steps 103 and 104 can be carried out simultaneously or in a different order than depicted in FIG. 2.

Referring again to FIG. 1B, the positioning module 11, which can comprise an RTK or PPP positioning engine, takes input from carrier phase measurements $\phi_1$ and $\phi_2$, and code measurements $P_1$ and $P_2$ from n satellites (only measurements 200, 201, 202 for three satellites are shown) determined in tracking module 12. For each satellite the carrier phase measurements are input to the disturbance detection module 15, which is configured to determine a variance tracer, in particular a thermal noise variance as described herein. The dashed lines illustrate two possible outcomes of the test. If the variance tracer exceeds a threshold, the carrier phase measurement input to positioning module 11 may be blocked, or may be given reduced importance level (e.g. by appropriate weighting) or a warning may be given. If the thermal noise variance does not exceed a threshold, the phase measurement input is not blocked.

It will be appreciated that in step 105 multiple levels of thresholds may be defined, and based thereon, the carrier phase measurements may be (i) blocked, or (ii) may be reduced in importance level (e.g. by appropriate weighting) or (iii) a warning may be given but the carrier phase measurement may not be blocked. In addition, or alternatively to blocking the carrier phase measurement, the code measurements may be blocked based on the outcome of the test of step 105.

In one embodiment, the observable of Eq. (7) is used as a direct indication of the thermal noise variance. A disturbance can then be detected if the value of $y_k$ meets a predetermined requirement, e.g. if it exceeds a threshold value. However, the observable of Eq. (7) can be noisy, and appropriate noise reduction techniques can be used. One advantageous noise reduction technique is Kalman filtering.

Advantageously, the observable of Eq. (7) is used in a Kalman filter to determine the thermal noise variance. In the example below, this Kalman filter is named the Thermal noise filter (TNF) and can be set up as follows.

A Kalman filter takes observations y at epoch k and its variance-covariance matrix $Q_{y_k}$ as input. These observations are related to the unknown states $x_k$ by a linear relation $H_k$ (the design matrix) as:

$$E\{y_k\}=H_k x_k. \tag{8}$$

Eq. (8) is called the observation equation, which will be described explicitly for the TNF below. The Kalman filter also takes the states of a previous epoch as input. The goal of a Kalman filter is to estimate the states $x_k$; the estimated (filtered) states are denoted by $\hat{x}_{k|k}$.

The equations for a Kalman filter can be found in many text books. In the present description, a notation is used that is close to Teunissen, P. J. G., Dynamic data processing: Recursive least-squares, Series on mathematical geodesy and positioning, VSSD, ISBN 9065622179, 9789065622174, Delft. An overview of the equations relating to the TNF is shown on the left hand side of FIG. 3.

Figure 3:
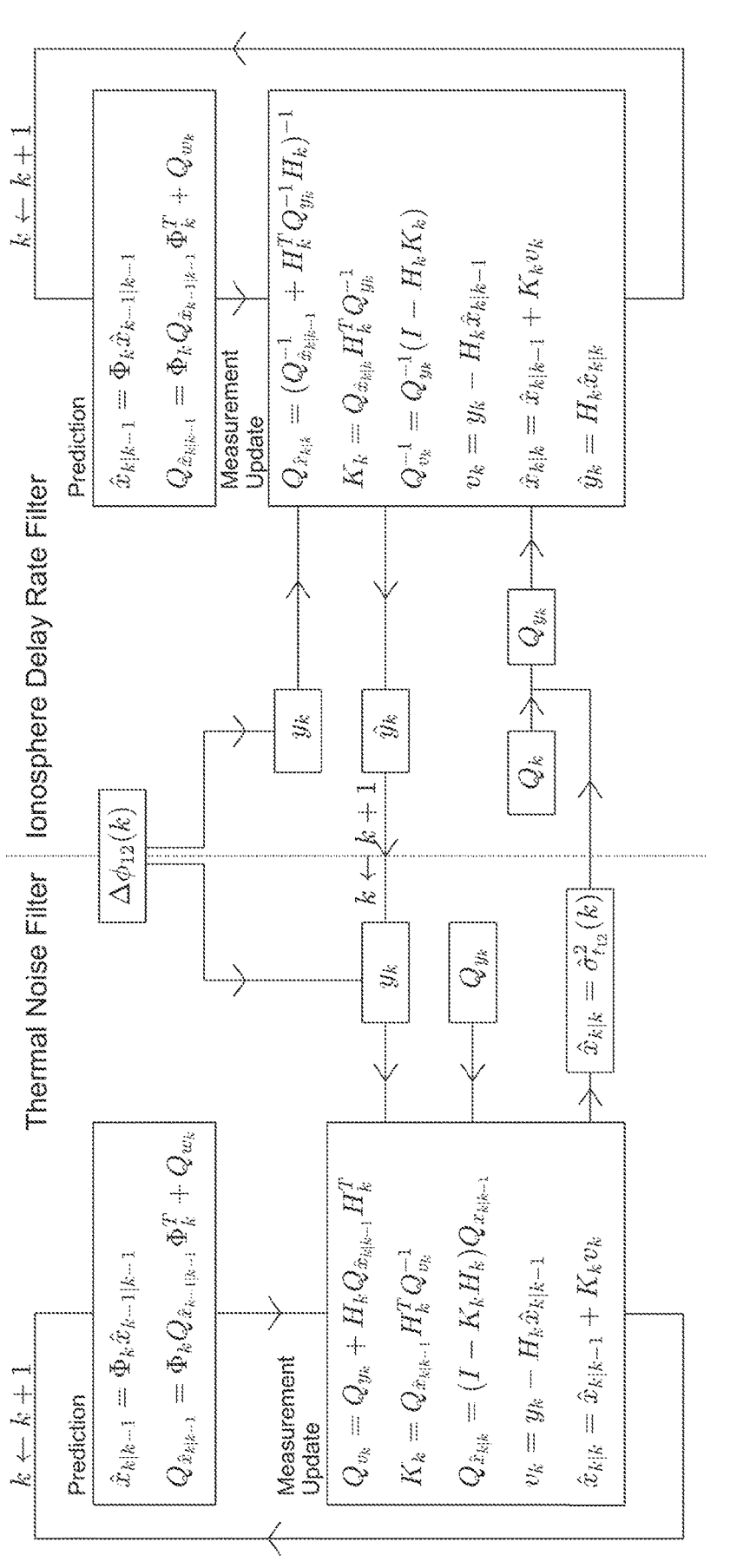
FIG. 3 represents a diagram of two Kalman filters implementing the Thermal noise filter (TNF) and the Ionosphere delay rate filter (IDRF) as described herein.

A Kalman filter consist of two steps: a prediction (time update), and a measurement update step. The following matrices are shown in FIG. 3: $\Phi_k$ is the transition matrix, $Q_{w_k}$ is the system noise matrix, $Q_{\hat{x}_{k|k-1}}$ is the variance-covariance matrix of the predicted states $\hat{x}_{k|k-1}$, $Q_{\hat{x}_{k-1|k-1}}$ is the variance-covariance matrix of the filtered states $\hat{x}_{k-1|k-1}$ of the previous epoch, $K_k$ is the Kalman gain matrix, and $Q_{v_k}$ is the variance-covariance matrix of the predicted residuals $v_k$.

The Thermal Noise Filter (TNF)

Eq. (5) shows the following thermal noise term:

$$\varepsilon_{12}(k) - \varepsilon_{12}(k-1) = \underbrace{[-1, 1, 1, -1]}_{e^T} \underbrace{\begin{bmatrix} \varepsilon_1(k-1) \\ \varepsilon_2(k-1) \\ \varepsilon_1 k \\ \varepsilon_2 k \end{bmatrix}}_{\varepsilon}. \tag{9}$$

The observable from Eq. (7) has expected values:

$$E\{y_k\}=\tfrac{1}{2}c^T E\{y^T\}c=\tfrac{1}{2}c^T D\{\varepsilon\}e. \tag{10}$$

In Eq. (10), $E\{.\}$ represents the mathematical expectation and $D\{.\}$ the mathematical dispersion.

A suitable noise model for the mathematical dispersion can be set up. By way of example, two possible noise models are given below:

$$D\{\varepsilon\} = \sigma_{t_{12}}^2(k)\begin{bmatrix} \alpha(k) & & & \\ & 1-\alpha(k) & & \\ & & \alpha(k) & \\ & & & 1-\alpha(k) \end{bmatrix}, \tag{11}$$

and $$D\{\varepsilon\} = \begin{bmatrix} \sigma_{t_1}^2(k) & \sigma_{t_1}^2(k) & 0 & 0 \\ \sigma_{t_1}^2(k) & \sigma_{t_1}^2(k)+\sigma_{t_{12}}^2(k) & 0 & \rho(k)\sigma_{t_{12}}^2(k) \\ 0 & 0 & \sigma_{t_1}^2(k) & \sigma_{t_1}^2(k) \\ 0 & \rho(k)\sigma_{t_{12}}^2(k) & \sigma_{t_1}^2(k) & \sigma_{t_1}^2(k)+\sigma_{t_{12}}^2(k) \end{bmatrix}, \tag{12}$$

where $\sigma_{t_{12}}{}^2$ is the thermal noise variance of $\phi_{12}$. The model of Eq. (12) is suitable for the GPS L2P signal which has correlations between the L1 and L2 carrier phase observations. The model of Eq. (11) is suitable for most other GNSS signals as long as $\Delta t(k)$ is sufficiently large.

The covariance matrices have model parameters $\alpha(k)$ and correlation coefficient $\rho(k)$. These can typically be modelled as function of elevation angle $\varepsilon(k)$ or carrier-to-noise ratio $C/N_0$. Simple piece-wise linear functions are sufficient and can be found when tracker covariance information is available from the receiver by a calibration with a data set under non-scintillation open-sky conditions. The $\alpha(k)$ parameter however will vanish from the observation equations below, and no calibration is required.

For the correlation coefficient $\rho(k)$ the following model can be used for GNSS receivers of Septentrio, Belgium:

$$\rho(k) = \begin{cases} 0.34217 + 0.01200 \cdot \epsilon(k) & \text{for } \epsilon(k) < 30; \\ 0.70221 + 0.00478 \cdot (\epsilon(k)-30) & \text{for } 30 \le \epsilon(k) \le 60; \\ 0.84560 & \text{for } \epsilon(k) \ge 60; \end{cases} \tag{13}$$

and other models can be easily set up for other receivers as indicated above.

Using the model of Eq. (11), the following observation equation can be derived from Eq. (10) for the Kalman filter (TNF):

$$E\{y_k\}=1\cdot\sigma_{t_{12}}{}^2(k) \tag{14}$$

where $H_k=[1]$ and $x_k=[\sigma_{t_{12}}{}^2(k)]$.

Using instead the model of Eq. (12), the following observation equation can be derived from Eq. (10) for the Kalman filter (TNF):

$$E\{y_k\}=(1-\rho(k))\cdot\sigma_{t_{12}}{}^2(k) \tag{15}$$

where $H_k=[1-\rho(k)]$ and $x_k=[\sigma_{t_{12}}{}^2(k)]$.

In both cases, the observable $y_k$ of Eq. (7) is used as input for the TNF, which estimates the scalar state $\sigma_{t_{12}}{}^2(k)$.

In order to operate the TNF, information for the ionosphere delay rate $\dot{I}_r(k)$ is required. The ionosphere delay rate can be determined according to known methods. By way of example, the ionosphere delay rate can be estimated by the positioning module 11, e.g. if the ionosphere delay rates are states in the positioning algorithm implemented in positioning module 11, or more likely if the ionosphere delays themselves are states in the positioning algorithm and the ionosphere delay rates are derived from them. Alternatively, according to an aspect of the present disclosure, the following relation, derived from Eq. (5), is used for determining the ionosphere delay rate:

$$\dot{I}_r(k) = \frac{\Delta\phi_{12}(k)}{-\mu\Delta t(k)}. \tag{16}$$

It will be appreciated that only the carrier phase difference $\Delta\phi_{12}(k)$ needs to be measured/determined for determining the ionosphere delay rate. From Eq. (7) it can be seen that the thermal noise variance is advantageously determined based on only one type of input or measurement, i.e. based on the carrier phase difference $\Delta\phi_{12}(k)$ only.

Advantageously, a second Kalman filter, referred to herein as the Ionosphere Delay Rate Filter (IDRF), is used for determining $\dot{I}_r(k)$. As shown in FIG. 3, the filtered observations of the IDRF are fed to the TNF. Vice versa, the output of the TNF is used to compute the (scalar) variance-covariance matrix of the IDRF, i.e. two Kalman filters are used to determining the thermal noise variance. It will be appreciated that although the present description refers to the variance-covariance matrix, the matrix is in fact a scalar in the instant case.

The Ionosphere Delay Rate Filter (IDRF)

This second Kalman filter takes the right hand side of Eq. (16) as the observable $y_k$:

$$y_k = \frac{\Delta\phi_{12}(k)}{-\mu\Delta t(k)}.$$  (17)

The corresponding variance is:

$$Q_{y_k} = \sigma_{t_{12}}^2(k) \cdot \underbrace{\frac{2H_k^{TNF}}{(\mu\Delta t(k))^2}}_{Q_k},$$  (18)

where $H_k^{TNF}$ is the design matrix of the thermal noise filter from Eq. (14) or (15). Substituting the estimated $\hat{\sigma}_{t_{12}}^2(k)$ from the thermal noise filter yields:

$$Q_{yk} = \sigma_{t_{12}}^2(k) \cdot Q_k.$$  (19)

The slant ionosphere delay rate $\dot{I}_r(k)$ can be modeled as the only state. Alternatively, a more elaborate model may better serve the purpose of estimating $\dot{I}_r(k)$. If the ionosphere delay is written as a product of a zenith ionosphere delay $I^z(k)$ and a mapping function $m(\epsilon(k))$ as function of elevation angle $\epsilon(k)$, as e.g. described in Klobuchar, J. A., Ionosphere time-delay algorithm for single-frequency GPS users, Transactions on Aerosphere and Electronic Systems, 23(3), pp. 325-331, then the following observation equation is obtained:

$$y_k = \underbrace{[\dot{m}(\epsilon(k)),\, m(\epsilon(k))]}_{H_k} \underbrace{\begin{bmatrix} I_r^z(k) \\ \dot{I}_r^z(k) \end{bmatrix}}_{x_k},$$  (20)

where $\dot{m}(\epsilon(k))$ is the time-derivative of $m(\epsilon(k))$ and $\dot{I}_r^z(k)$ is the zenith ionosphere delay rate.

The filtered state $\hat{y}_k = H_k \hat{x}_{k|k}$ forms an estimate of $\dot{I}_r(k)$ which is input to the thermal noise filter (TNF). FIG. 3 shows the input $\Delta\phi_{12}(k)$ is used as input for both filters in Eq. (14, 15) and Eq. (17). The $\hat{y}_k^{IDRF}$ from the IDRF is taken in the next epoch as input for observation of the TNF according to Eq. (7):

$$y_p^{TNF} = \tfrac{1}{2}(\Delta\phi_{12}(k) + \mu y_{k-1}^{IDRF}\Delta t(k))^2.$$  (21)

In the IDRF, as shown in FIG. 3, $Q_{y_k}$ from Eq. (19) takes input from $Q_k$ and the estimated thermal noise variance $\hat{\sigma}_{t_{12}}^2(k)$. It will be appreciated that in the IDRF, $Q_{y_k}$ is not strictly required, but may be used for statistical tests, the outcomes of which may be used to steer this filter. Usually not output in a Kalman filter, but in this embodiment added in the measurement update of the IDRF are the filtered observations $\hat{y}_k$.

It will be convenient to note that two representation forms of the measurement update equations are possible. In FIG. 3 both representation forms are used. One representation form of the measurement update equations is used on the left-hand side of FIG. 3. The other representation form is used on the right-hand side (the first three equations differ). It will however be appreciated that either one of the two representation forms could be used in either filter. The matrices differ for both filters, but they are written here in the same notation.

The combination of two Kalman filters, i.e. one for determining the thermal noise variance and one for determining/updating the ionosphere delay rate allows to further decrease convergence time and improves response time of the disturbance detection compared to when only the TNF would be used.

The thermal noise variance under non-scintillation open-sky circumstances can be modelled as function of elevation angle or carrier-to-noise ratio C/NO using the same kind of calibration as indicated above. As detector for scintillation one can then use the ratio of the square root of the estimated thermal noise variance and the modelled value. Under the above conditions this ratio, which is referred to herein as scintillation factor (SF) will then be around 1. A threshold level for the scintillation factor (e.g. 3-5) can then be defined above which scintillation is considered significant.

The above method can be extended to using carrier phase measurements taken from three different carrier frequencies, e.g. L1, L2, and L5 for GPS. The carrier phase measurement of the third frequency will add an extra observable in the IDRF, obtaining a 2-by-1 observable vector comprised of Eq. (17) and A $\Delta\phi_{15}(k)/-\mu_{15}\Delta t(k)$, where $\mu_{15}$ is defined as in Eq. (3) based on the carrier wavelengths L1 and L5 (while $\mu$ being e.g. defined based on L1 and L2). The design matrix is extended to $$\begin{bmatrix} m(\epsilon(k)) & \dot{m}(\epsilon(k)) \\ m(\epsilon(k)) & \dot{m}(\epsilon(k)) \end{bmatrix},$$

of which the top row is as in Eq. (20). The TNF can be extended from one to three observables, adding to Eq. (7) the observables $\tfrac{1}{2}(\Delta\phi_{15}(k) + \mu_{15}\dot{I}_r(k)\Delta t(k))^2$, and $\tfrac{1}{2}(\Delta\phi_{12}(k) + \mu\dot{I}_r(k)\Delta t(k))(\Delta\phi_{15}(k) + \mu_{15}\dot{I}_r(k)\Delta t(k))$. The design matrix will depend on the noise model for the three frequencies.

Experiments

The TNF and IDRF Kalman filters were tested on data from a GNSS receiver (PolaRx4, Septentrio, Belgium). Bounding was applied in both filters, meaning that values larger than a threshold are set to that threshold value. This allows the filters to stay within a normal range of values. In the IDRF a w-test was applied ($|\hat{v}_k / \sqrt{Q_v}|$). The measurement update was discarded if this value exceeded the threshold. Table 1 sets out the filter components that were used for the TNF and IDRF.

TABLE 1

| | TNF | IDRF |
|---|---|---|
| TNF and IDRF filter components used in the experiments | | |
| Design matrix ($H_k$) | GPS L2P: $(1 - \rho(k))$, Eq. (13) L2C: 1 | $[10^3 \dot{m}(\epsilon(k)), m(\epsilon(k))]$ |
| System noise $(\sigma_{wk}^2, Q_{w_k})$ | Eq. (22), [mm⁴/s] | $\sigma_w^2 \begin{bmatrix} \frac{1}{3} 10^{-6} \Delta t(k)^3 & \frac{1}{2} 10^{-3} \Delta t(k)^2 \\ \frac{1}{2} 10^{-3} \Delta t(k)^2 & \Delta t(k) \end{bmatrix}$ $\sigma_w^2 = 10^{-4}$ mm²/s³ |
| Observation noise $(\sigma_{yk}^2, Q_{y_k})$ | Eq. (23), [mm²] | $\hat{y}_k$ from TNF [mm²/s²], if SF(k) > 3, multiply by 4 |
| Initial state ($\hat{u}_{0\|0}$) | Eq. (24), [mm] | $\begin{bmatrix} 3 \text{ m} \\ 0 \text{ mm/s} \end{bmatrix}$ |
| Covariance of initial state $\left(Q_{\hat{u}_{0\|0}}\right)$ | 25 $Q_{y_k}$ [mm²] | $\begin{bmatrix} 100 \text{ m}^2 & 0 \text{ m mm s}^{-1} \\ 0 \text{ m mm s}^{-1} & 100 \text{ mm}^2/\text{s}^2 \end{bmatrix}$ |
| Transition matrix ($F_k$) | 1 | $\begin{bmatrix} 1 & 10^{-3} \Delta t(k) \\ 0 & 1 \end{bmatrix}$ |
| w-test value | not computed | computed, threshold is set to 5 |
| Bounding | $0 < \hat{u}_{k\|k}$, SF (k) $\leq$ 5 | $\|\hat{y}_k\| < 12$ mm/s |
| Prediction | only when measurement update | every 1 s |
| Reaction on cycle slip | limit $\hat{u}_k$ to maximum value | skip measurement update if detected with w-test |
| maximum $\Delta t(k)$ | 5 s | 5 s |

*GPS L2P*:   $0 < \epsilon <= 20$ deg   $\sigma_w = 1.19384 - 0.05924 \cdot \epsilon$;
          $20 < \epsilon <= 90$ deg   $\sigma_w = 0.00908 - 0.00009 \cdot (\epsilon - 20)$;
*GPS L2C*:   $0 < \epsilon <= 20$ deg   $\sigma_w = 1.45047 - 0.06566 \cdot \epsilon$;
          $20 < \epsilon <= 40$ deg   $\sigma_w = 0.13729 - 0.00301 \cdot (\epsilon - 20)$;
          $40 < \epsilon <= 90$ deg   $\sigma_w = 0.07701 - 0.00148 \cdot (\epsilon - 40)$;
$$\text{(22)}$$

*GPS L2P*:   $0 < \epsilon <= 20$ deg   $\sigma_y = 5.26049 - 0.24850 \cdot \epsilon$;
          $20 < \epsilon <= 40$ deg   $\sigma_y = 0.29045 - 0.00818 \cdot (\epsilon - 20)$;
          $40 < \epsilon <= 90$ deg   $\sigma_y = 0.12679 - 0.00183 \cdot (\epsilon - 40)$;
*GPS L2C*:   $0 < \epsilon <= 20$ deg   $\sigma_y = 23.55945 - 0.91377 \cdot \epsilon$;
          $20 < \epsilon <= 40$ deg   $\sigma_y = 5.28404 - 0.16961 \cdot (\epsilon - 20)$;
          $40 < \epsilon <= 90$ deg   $\sigma_y = 1.89180 - 0.03058 \cdot (\epsilon - 40)$;
$$\text{(23)}$$

*GPS L2P*:   $0 < \epsilon <= 20$ deg   $\sigma_{t_{12}} = 3.48661 - 0.13271 \cdot \epsilon$;
          $20 < \epsilon <= 40$ deg   $\sigma_{t_{12}} = 0.83241 - 0.02469 \cdot (\epsilon - 20)$;
          $40 < \epsilon <= 90$ deg   $\sigma_{t_{12}} = 0.33867 - 0.00251 \cdot (\epsilon - 40)$;
*GPS L2C*:   $0 < \epsilon <= 20$ deg   $\sigma_{t_{12}} = 4.12812 - 0.10542 \cdot \epsilon$;
          $20 < \epsilon <= 40$ deg   $\sigma_{t_{12}} = 2.01979 - 0.04106 \cdot (\epsilon - 20)$;
          $40 < \epsilon <= 90$ deg   $\sigma_{t_{12}} = 1.19854 - 0.01105 \cdot (\epsilon - 40)$;
$$\text{(24)}$$

Figure 4:
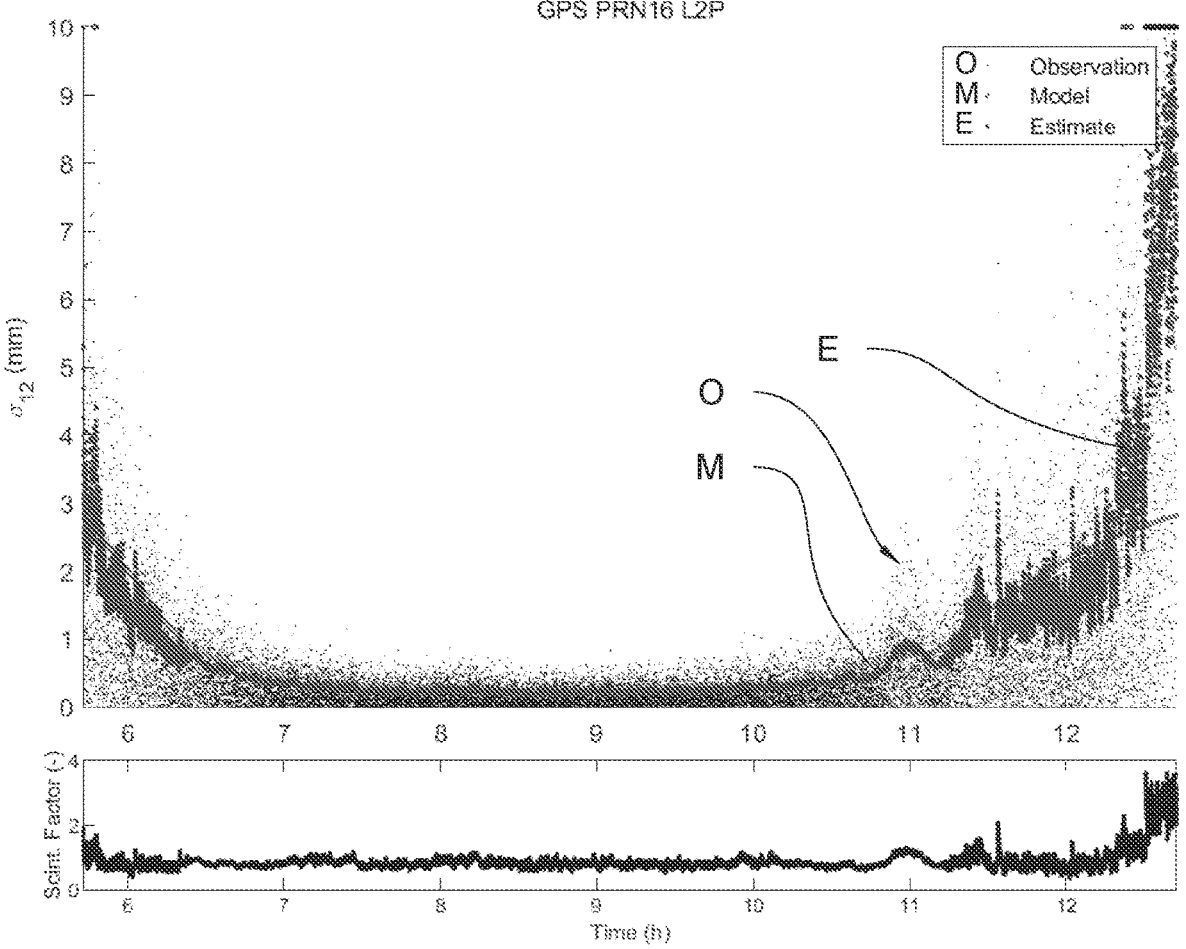
FIG. 4 represents TNF results of PRN16 for a Singapore 2013 dataset after IDRF feedback to the TNF was applied according to the scheme of FIG. 3.
Figure 6:
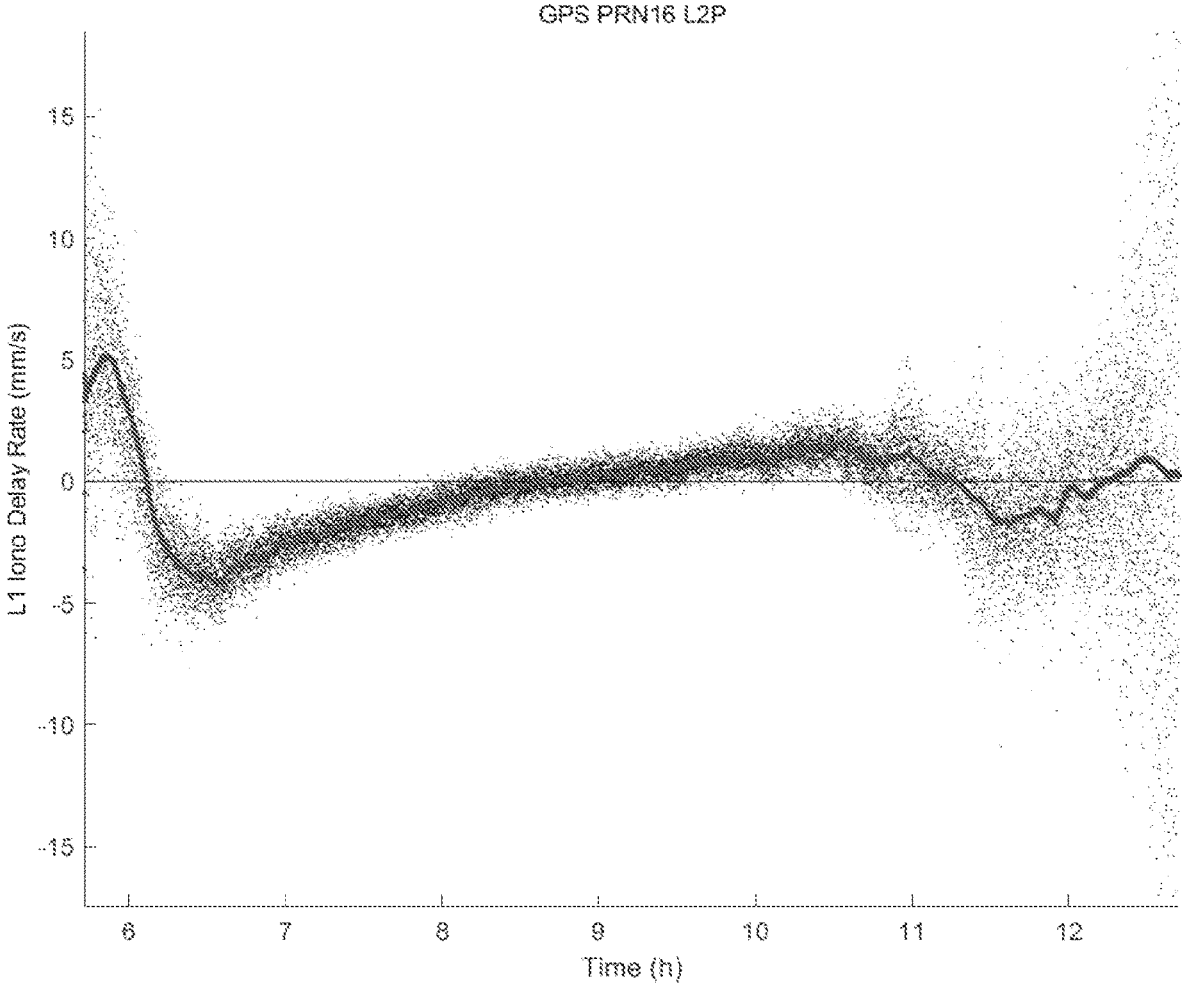
FIG. 6 represents IDRF results of PRN16 for a Singapore 2013 dataset after IDRF feedback to the TNF was applied.

FIGS. 4 and 6 show the performance of the two filters of FIG. 3 under normal non-scintillation circumstances. In the figures, the Model M represents the values determined by Eq. (24), while the Estimate E represents the results of the TNF. The observations O represent the observable $y_k$ of the TNF. FIG. 4 shows the results of the TNF in the upper graph, and the scintillation factor in the lower graph. It can be seen that the estimate E remains close to the model M and the scintillation factor remains quite stable about the value 1, and no scintillation events occur in this time frame. FIG. 6 shows the results of the IDRF. From the figures it can be seen that despite the noisy behaviour of the observations O, the Kalman filters are capable or estimating the thermal noise and ionosphere delay rate.

Figure 5:
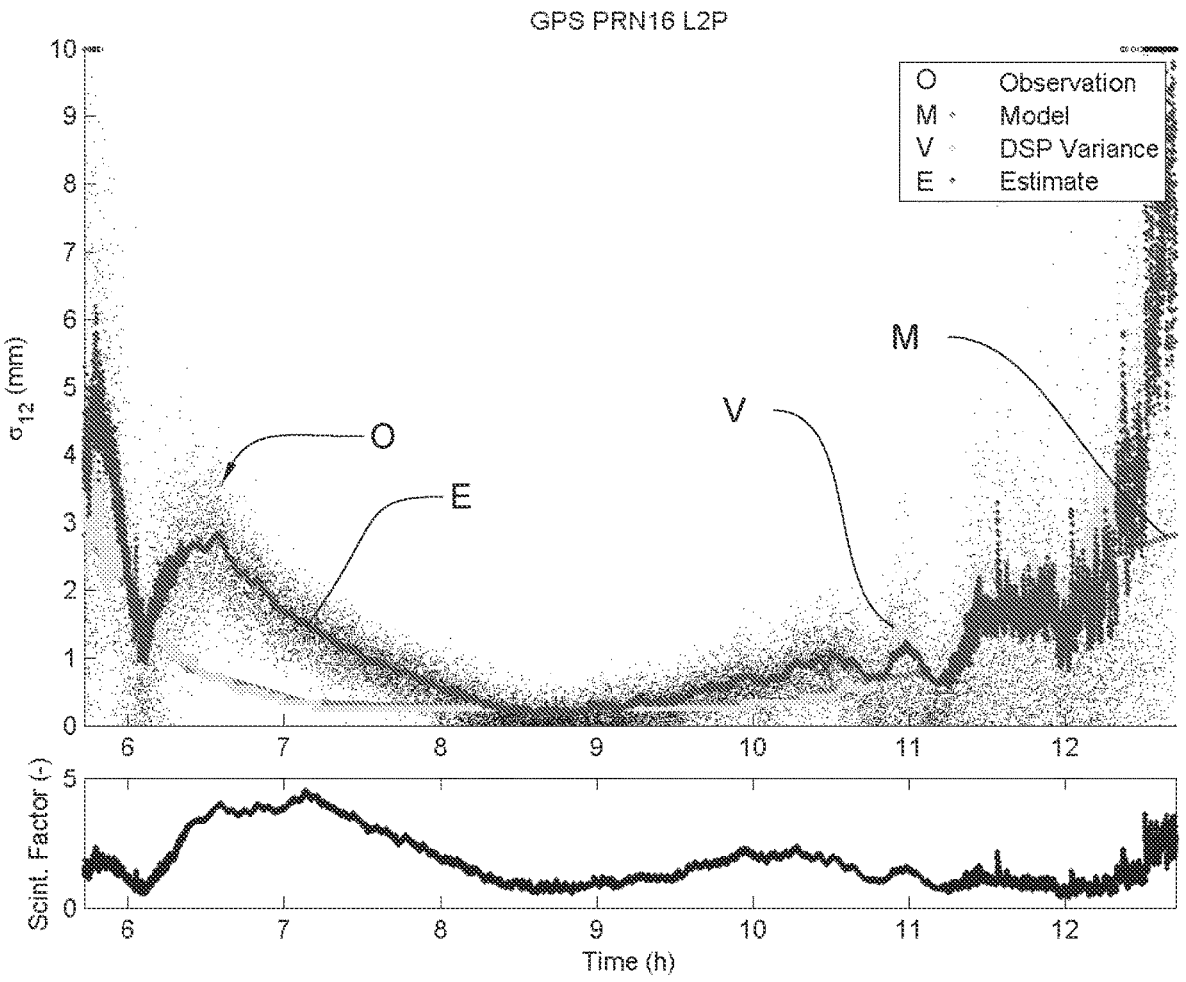
FIG. 5 represents TNF results of PRN16 for the same Singapore 2013 dataset of FIG. 4 before IDRF feedback to the TNF was applied.

FIG. 5 shows the TNF results for the same data as FIG. 4, where the thermal noise estimates have not been corrected by the ionosphere delay rates, i.e. a fixed value of the ionosphere delay rate of zero was applied (the IDRF was not used). It can be seen in the lower graph of FIG. 5 that the scintillation factor shows a higher variation. This plot illustrates the advantage of using the IDRF in methods described herein, since in FIG. 4 it removes the bump around 6.00-8.00 h which is visible in FIG. 5.

Figures 7A, 7B:
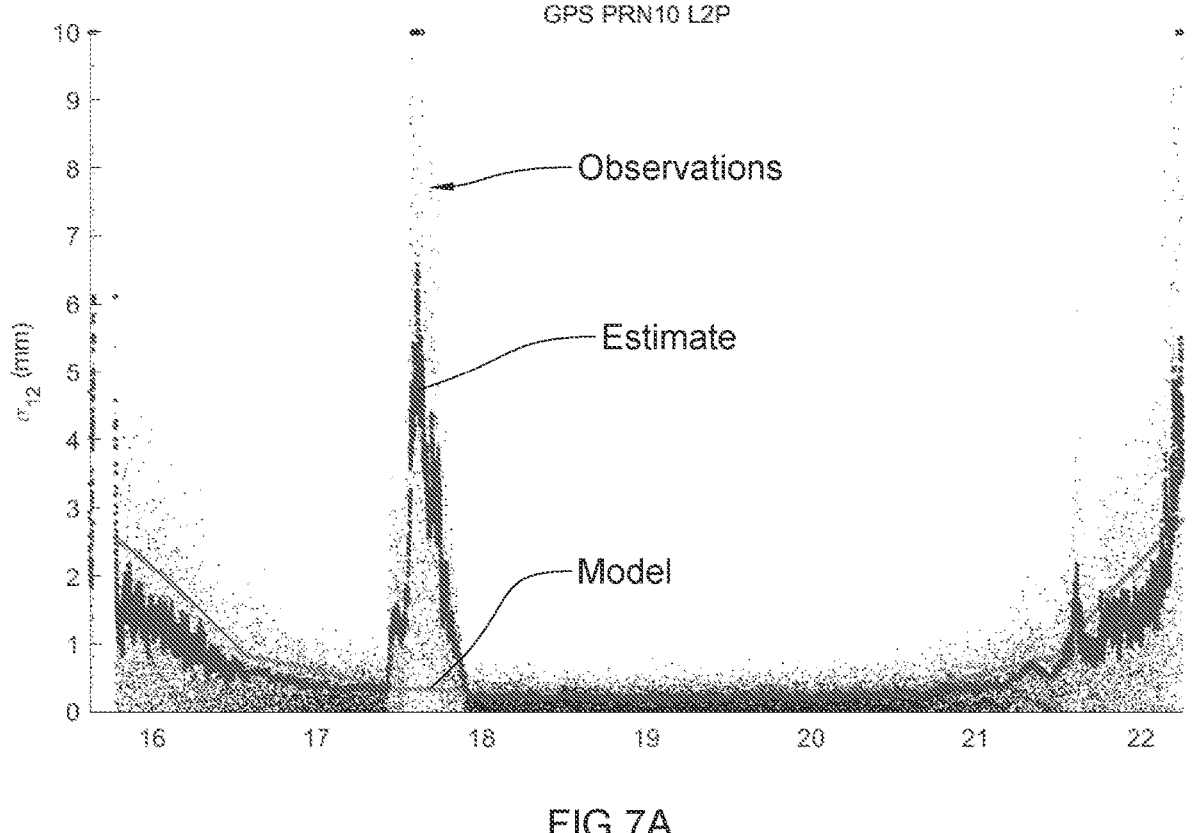
FIG. 7A represents TNF $\hat{\sigma}_{t_{12}}$ estimates and model values under occurrence of a scintillation event. The dots show the root of the observation values.
FIG. 7B represents the scintillation factor, i.e. the ratio between estimated and modelled values. A clear scintillation peak can be seen between 17.30 h and 18.00 h.
Figure 7C:
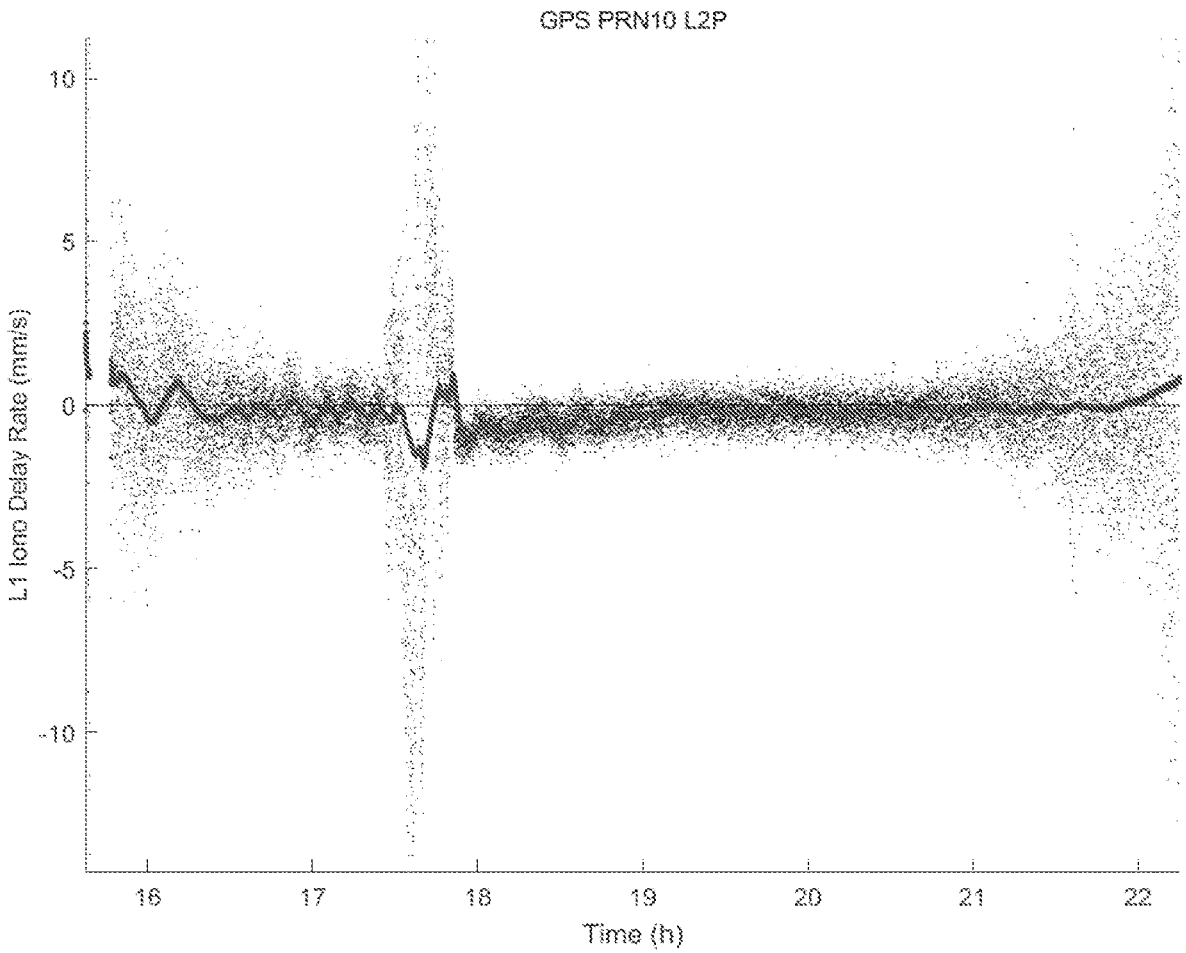
FIG. 7C represents corresponding estimated ionosphere delay rate and the observations used.

FIG. 7A shows the TNF results and FIG. 7C the IDRF results of another measurement set including a scintillation event. These plots illustrate a successful detection of the scintillation event around 17.30-18.00 h.

Figure 8A:
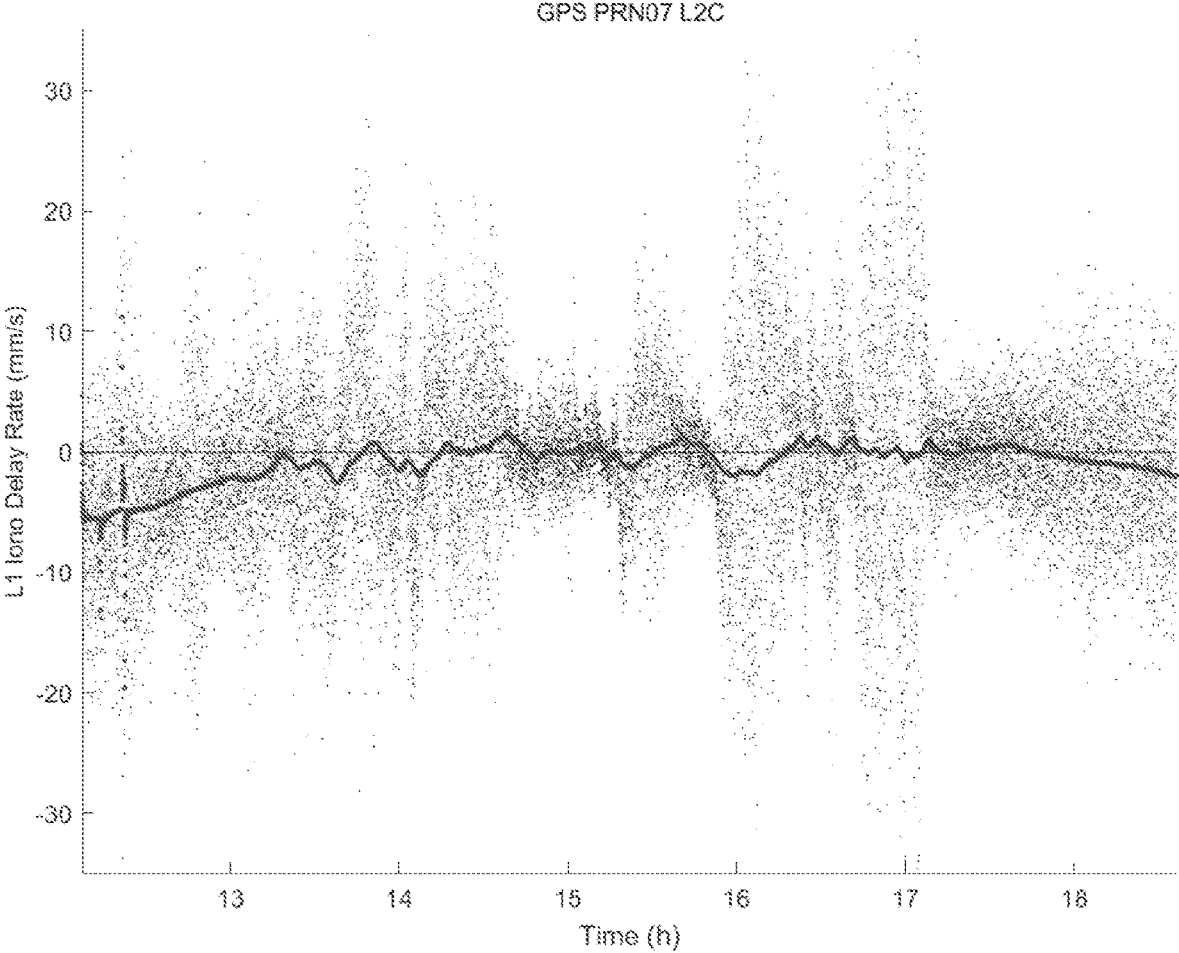
FIG. 8A represents IDRF results of a L1-L2C combination recording in Singapore 2013.
Figure 8B:
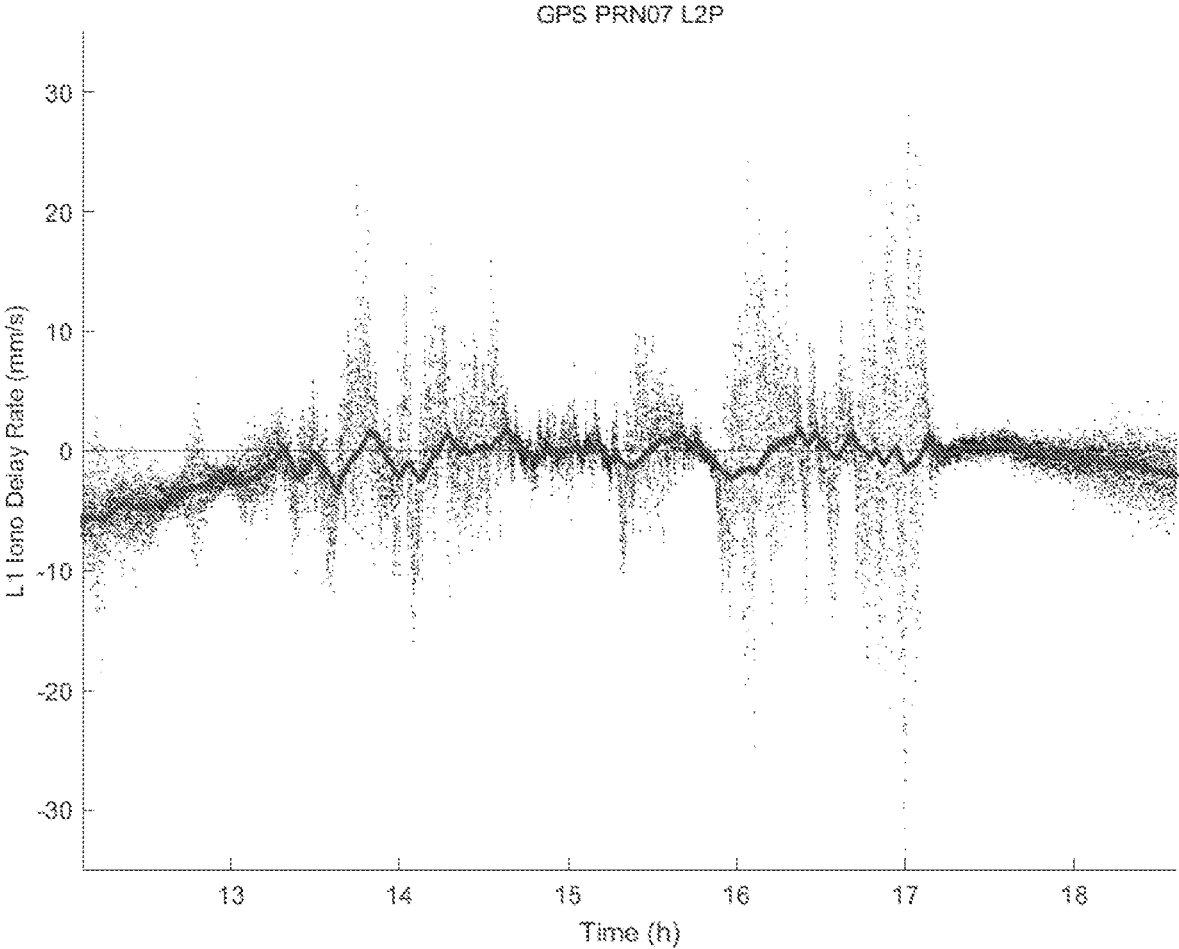
FIG. 8B represents IDRF results of a L1-L2P combination recording in Singapore 2013 at a same time corresponding to the recording of FIG. 8A.

FIGS. 8A-B show the IDRF results for a satellite with both L2C and L2P signals. The observation models of Eqs. (14) and (15) were used. Despite the lower noise of the L1-L2P ionosphere delay rate observations than those of L1-L2C, the Kalman filter results of the two signals are comparable, and the same ionosphere delay rate trend can be seen in both signals, evidencing the robustness of methods as described herein.

Aspects of the present disclosure are described in the following alphanumerically ordered clauses.

A1. Method of detecting a disturbance in a signal (21) of a GNSS satellite (20), comprising:

receiving from the GNSS satellite at least a first signal and a second signal having a carrier frequency different from a carrier frequency of the first signal, measuring a carrier phase difference ($\Delta\phi_{12}$) between at least the first signal and the second signal, determining an ionosphere delay rate, determining a first indicator based on a quadratic expression comprising a squared sum of a first term and a second term, wherein the first term comprises the measured carrier phase difference and the second term comprises the ionosphere delay rate, detecting the disturbance if the first indicator meets a predetermined requirement.

A2. Method of clause A1, wherein the first indicator corresponds to a thermal noise variance.

A3. Method of clause A1 or A2, wherein the quadratic expression is given by:

$$\tfrac{1}{2}(\Delta\phi_{12} + \mu\dot{i}_r\Delta t)^2,$$

or a scaled version thereof, wherein: $\Delta\phi_{12}$ represents the measured carrier phase difference, $\mu$ represents $$\frac{\lambda_1^2}{\lambda_r^2} - \frac{\lambda_2^2}{\lambda_r^2},$$

wherein $\lambda_1$ and $\lambda_2$ are the wavelengths of the carrier frequencies of the first signal and the second signal, respectively, and $\lambda_r$ is the wavelength of a reference frequency, $\dot{i}_r$ represents the ionosphere delay rate for the reference frequency, and $\Delta t$ represents a time interval of discretization.

A4. Method of any one of the preceding clauses, wherein the disturbance is detected if the first indicator exceeds a predetermined threshold.

A5. Method of any one of the preceding clauses, wherein the first indicator is determined by a first Kalman filter.

A6. Method of clause A5, wherein the quadratic expression is used in the first Kalman filter as an observable ($y_k$).

A7. Method of any one of the preceding clauses, comprising using the measured carrier phase difference as an input for determining the ionosphere delay rate.

A8. Method of clause A7, comprising determining a second expression as:

$$\frac{\Delta\phi_{12}}{-\mu\Delta t},$$

or a scaled version thereof, wherein: $\Delta\phi_{12}$ represents the measured carrier phase difference, $\mu$ represents $$\frac{\lambda_1^2}{\lambda_r^2} - \frac{\lambda_2^2}{\lambda_r^2},$$

wherein $\lambda_1$ and $\lambda_2$ are the wavelengths of the first signal and the second signal, respectively, and $\lambda_r$ is the wavelength of a reference frequency, $\Delta t$ represents a time interval of discretization, and using the second expression as an input for determining the ionosphere delay rate.

A9. Method of clause A7 or A8, wherein the ionosphere delay rate is determined by a second Kalman filter, wherein the measured carrier phase difference is used as an input to the second Kalman filter.

A10. Method of clause A9 in conjunction with clause A5 or A6, wherein an estimated state of the second Kalman filter is used for determining an observable of the first Kalman filter.

A11. Method of clause A10, wherein an output of the first Kalman filter is used to determine a covariance in the second Kalman filter.

A12. Method of determining navigation information based on GNSS navigation signals, comprising:

receiving GNSS navigation signals from a plurality of GNSS satellites, the GNSS navigation signals comprising, for each of the plurality of GNSS satellites at least a first signal and a second signal having a carrier frequency different from a carrier frequency of the first signal, for each of the GNSS satellites, performing carrier phase measurements on the first signal and the second signal, performing the method of any one of the preceding clauses using the carrier phase measurements to detect a disturbance in signals of the respective GNSS satellite, if the disturbance is detected, determining the navigation information comprising reducing a weight of or discarding a measurement of the signals in respect of which the disturbance is detected.

A13. Method of clause A12, wherein reducing a weight of or discarding a measurement of the signals in respect of which the disturbance is detected comprises reducing a weight of or discarding one or more of a carrier phase measurement and a code measurement.

A14. GNSS receiver system (100) comprising an antenna (14) for receiving a first signal and a second signal of a GNSS satellite and computing means (10) for processing the first signal and the second signal, wherein the computing means is configured to carry out the method of any one of the clauses A1 to A11, preferably comprising a navigation unit (11) configured to carry out the method of clause A12 or A13.

A15. Ionospheric scintillation monitoring device, comprising an antenna for receiving a first signal and a second signal of a GNSS satellite and a signal tracking unit configured to carry out the method of any one of the clauses A1 to A11.

The invention claimed is:

1. A method of detecting a disturbance in navigation signals of a GNSS satellite (20), the navigation signals comprising a first signal and a second signal, the method comprising:

receiving from the GNSS satellite at least the first signal and the second signal having a second carrier frequency different from a first carrier frequency of the first signal, measuring a carrier phase difference ($\Delta\phi_{12}$) between at least the first signal and the second signal and between different epochs, wherein the different epochs are no more than five seconds apart, determining an ionosphere delay rate, determining a first indicator based on a quadratic expression given by:

$$\frac{1}{2}(\Delta\phi_{12} + \mu i_r \Delta t)^2,$$

or a scaled version thereof, wherein: $\Delta\phi_{12}$ represents the measured carrier phase difference, $\mu$ represents $$\frac{\lambda_1^2}{\lambda_r^2} - \frac{\lambda_2^2}{\lambda_r^2},$$

wherein $\lambda_1$ and $\lambda_2$ are the wavelengths of the first and second carrier frequencies, respectively, and $\lambda_r$ is the wavelength of a reference frequency, $\dot{I}_r$ represents the ionosphere delay rate for the reference frequency, and $\Delta t$ represents a time interval of discretization, wherein the first indicator is determined by a first Kalman filter, wherein the quadratic expression is used in the first Kalman filter as an observable ($y_k$), and detecting the disturbance based on the first indicator meeting a predetermined requirement, wherein the ionosphere delay rate is determined by a second Kalman filter, wherein the measured carrier phase difference is used as an input to the second Kalman filter.

2. The method of claim 1, wherein the first indicator corresponds to a thermal noise variance.

3. The method of claim 1, wherein the disturbance is detected in response to the first indicator exceeding a predetermined threshold.

4. The method of claim 1, further comprising determining a second expression as:

$$\frac{\Delta\phi_{12}}{-\mu\Delta t},$$

or a scaled version thereof, and using the second expression as an observable in the second Kalman filter.

5. The method of claim 1, further comprising using an estimated state of the second Kalman filter for determining an observable of the first Kalman filter.

6. The method of claim 5, further comprising using an output of the first Kalman filter to determine a covariance in the second Kalman filter.

7. The method of claim 1, wherein the different epochs are no more than one second apart.

8. A method of determining navigation information based on GNSS navigation signals, the method comprising:

receiving GNSS navigation signals from a plurality of GNSS satellites, the GNSS navigation signals comprising, for each of the plurality of GNSS satellites at least a first signal and a second signal having a carrier frequency different from a carrier frequency of the first signal, for each of the GNSS satellites, performing carrier phase measurements on the first signal and the second signal, measuring a carrier phase difference ($\Delta\phi_{12}$) between at least the first signal and the second signal and between different epochs, wherein the different epochs are no more than five seconds apart, determining an ionosphere delay rate, determining a first indicator based on a quadratic expression given by:

$$\frac{1}{2}(\Delta\phi_{12} + \mu i_r \Delta t)^2,$$

or a scaled version thereof, wherein: $\Delta\phi_{12}$ represents the measured carrier phase difference, $\mu$ represents $$\frac{\lambda_1^2}{\lambda_r^2} - \frac{\lambda_2^2}{\lambda_r^2},$$

wherein $\lambda_1$ and $\lambda_2$ are the wavelengths of the first and second carrier frequencies, respectively, and $\lambda_r$ is the wavelength of a reference frequency, $\dot{I}_r$ represents the ionosphere delay rate for the reference frequency, and $\Delta t$ represents a time interval of discretization, wherein the first indicator is determined by a first Kalman filter, wherein the quadratic expression is used in the first Kalman filter as an observable ($y_k$), and detecting a disturbance in the navigation signals of the respective GNSS satellite based on the first indicator meeting a predetermined requirement, wherein the ionosphere delay rate is determined by a second Kalman filter, wherein the measured carrier phase difference is used as an input to the second Kalman filter; and in response to detecting the disturbance, determining the navigation information comprising reducing a weight of or discarding a measurement of the signals in respect of which the disturbance is detected.

9. The method of claim 8, wherein reducing a weight of or discarding a measurement of the signals in respect of which the disturbance is detected comprises reducing a weight of or discarding one or more of a carrier phase measurement and a code measurement.

10. The method of claim 8, wherein the different epochs are no more than one second apart.

11. A GNSS receiver system (100) comprising an antenna (14) for receiving a first signal and a second signal of a GNSS satellite and a computing unit configured to process the first signal and the second signal, wherein the computing unit is further configured to detect a disturbance in a signal of the GNSS satellite by carrying out the method of claim 1.

12. The GNSS receiver system of claim 11, further comprising a navigation unit (11) configured to:

receive GNSS navigation signals from a plurality of GNSS satellites, the GNSS navigation signals comprising, for each of the plurality of GNSS satellites, at least a first signal and a second signal having a carrier frequency different from a carrier frequency of the first signal, for each of the GNSS satellites, perform carrier phase measurements on the first signal and the second signal, wherein the computing unit is configured to detect a disturbance in at least one of the GNSS navigation signals based on the carrier phase measurements of the respective GNSS satellite, and wherein the navigation unit is configured to determine navigation information.

13. The GNSS receiver system of claim 12, wherein in response to the computing unit detecting the disturbance in respect of a respective one of the GNSS navigation signals, the navigation unit is configured to reduce a weight of, or to discard, a measurement of the respective GNSS navigation signal.

14. The GNSS receiver system of claim 11, further comprising an RTK base receiver configured to provide the first signal and the second signal.

15. An ionospheric scintillation monitoring device, comprising an antenna for receiving a first signal and a second signal of a GNSS satellite and a signal tracking unit configured to detect a disturbance in a signal of the GNSS satellite by carrying out the method of claim 1.

\* \* \* \* \*